United States Patent [19]
Kim

[11] Patent Number: 5,703,699
[45] Date of Patent: Dec. 30, 1997

[54] METHOD FOR AUTOMATICALLY RECEIVING IMAGE DATA IN FACSIMILE SYSTEM REGARDLESS OF WHETHER SUCH FACSIMILE SYSTEM IS OPERATING IN PRIVATE LINE MODE OR PUBLIC LINE MODE

[75] Inventor: Sung-Hyun Kim, Gumi, Rep. of Korea

[73] Assignee: SamSung Electronics Co., Ltd., Suwon, Rep. of Korea

[21] Appl. No.: 654,431

[22] Filed: May 28, 1996

[30] Foreign Application Priority Data

May 27, 1995 [KR] Rep. of Korea ............... 13568/1995

[51] Int. Cl.$^6$ ............................................. H04N 1/32
[52] U.S. Cl. ................ 358/442; 358/434; 358/436; 379/100
[58] Field of Search ................. 358/434–436, 358/438–440, 442, 468; 379/97–98, 100, 93; H04N 1/32

[56] References Cited

U.S. PATENT DOCUMENTS

| | | |
|---|---|---|
| 4,584,434 | 4/1986 | Hashimoto . |
| 4,800,439 | 1/1989 | Yoshino . |
| 4,910,764 | 3/1990 | Bowen . |
| 4,974,253 | 11/1990 | Hashimoto . |
| 5,131,026 | 7/1992 | Park . |
| 5,185,783 | 2/1993 | Takahashi et al. . |
| 5,202,915 | 4/1993 | Nishii . |
| 5,255,312 | 10/1993 | Koshiishi . |
| 5,280,519 | 1/1994 | Nakajima et al. ............ 358/442 |
| 5,333,179 | 7/1994 | Yamamoto et al. . |
| 5,487,105 | 1/1996 | Sakai . |
| 5,563,932 | 10/1996 | Tachibana et al. ............ 358/434 |
| 5,642,409 | 6/1997 | Kotani et al. ............ 358/442 |

*Primary Examiner*—Kim Vu
*Attorney, Agent, or Firm*—Robert E. Bushnell, Esq.

[57] ABSTRACT

A method for automatically receiving image data in a facsimile system regardless whether such a facsimile system is operating in either a private line mode or a public line mode. The method includes the steps of: automatically receiving the image data in an automatic reception mode upon reception of a ring signal; forming a voice speech upon detection of a hook-off state of a telephone after the ring signal is received; and automatically receiving the image data when the ring signal is not received and a calling tone signal is detected.

16 Claims, 3 Drawing Sheets

METHOD FOR AUTOMATICALLY RECEIVING IMAGE DATA IN FACSIMILE SYSTEM REGARDLESS OF WHETHER SUCH FACSIMILE SYSTEM IS OPERATING IN PRIVATE LINE MODE OR PUBLIC LINE MODE

CROSS-REFERENCE TO RELATED APPLICATION

This application makes reference to, incorporates the same herein, and claims all benefits accruing under 35 U.S.C. §119 from an application for Method For Automatically Receiving Image Data In Facsimile System Regardless Of Whether Such Facsimile System is Operating In Private Line Mode Or Public Line Mode earlier filed in the Korean Industrial Property Office on 27 May 1995, and there duly assigned Serial No. 13568/1995.

BACKGROUND OF THE INVENTION

1. Technical Field

The present invention relates to a method for automatically receiving image data in a facsimile system and, in particular, to a method for automatically receiving image data in a facsimile system regardless of whether such a facsimile system is operating in a private line mode or a public line mode.

2. Background Art

Generally, conventional facsimile systems as commonly available in the market today receive image data reflecting a document such as, for example, U.S. Pat. No. 4,908,851 for Facsimile Apparatus Operable In Facsimile Or Conversation Mode issued to Kotani et at., U.S. Pat. No. 5,255,311 for Data Communication Apparatus issued to Yoshida, and U.S. Pat. No. 5,487,105 for Facsimile Apparatus Operable In Facsimile Or Telephone Mode issued to Sakai, are well known in the communication art for selectively operating in a facsimile mode and a telephone mode. Many other facsimile systems such as disclosed, for example, in U.S. Pat. No. 5,131,026 for Facsimile System Having Auto-Answering Function issued to Park and U.S. Pat. No. 5,333,179 for Facsimile Apparatus With Automatic Answering Telephone Function issued to Yamamoto et al., further include an automatic reception mode for recording a voice message from a calling subscriber.

Such conventional facsimile systems, however, receives image data from another device such as a remote telephone or another facsimile system using a ring counter automatic reception method often known as a public line mode automatic reception method. This public line mode automatic reception method requires a connection through a public switch telephone network (PSTN) in which, upon a facsimile call from a counterpart facsimile system, a number of standard ring tone is determined with reference to a predetermined number in order to automatically receive image data from the counterpart facsimile system connected to the PSTN. If a private line communication between one facsimile system and another facsimile system without passing through the PSTN is desired in a context of a large corporation or office having a plurality of remote facsimile systems for the purposes of enhancing communication efficiency and security, such conventional facsimile systems need additional and costly circuitry to operate in a private line mode in which an on-hook/off-hook state of a counterpart facsimile system is determined without using a standard ring tone generated from the PSTN for enabling direct communication between one facsimile system and another facsimile system within the corporation without passing through the PSTN.

In this specially constructed facsimile system, a mode selection switch is necessarily required to allow the operator to select between a private line mode of operation and a public line mode of operation. In the private line mode, such a conventional facsimile system simply requires an operator to press a transmission button to transmit image data reflecting a document to a counterpart facsimile system, or remains in a stand-by state to receive image data transmitted from the counterpart facsimile system. Once the facsimile system is in the private line mode however, image data passing through the PSTN cannot be received unless the mode selection switch switches from the private line mode to a public line mode; otherwise, an internal circuit of the receiver can be damaged and the image data cannot be received.

SUMMARY OF THE INVENTION

Accordingly, it is therefore an object of the present invention to provide an improved facsimile system operable in both a public line mode and a private line mode.

It is also an object to provide an improved facsimile system for automatically receiving image data regardless of whether the facsimile system is operating in a public line mode or a private line mode.

It is further an object to provide a method for automatically receiving image data in a facsimile system regardless of whether such a facsimile system is operating in either a private line mode or a public line mode.

These and other objects of the present invention can be achieved with a method for automatically receiving image data in a facsimile system regardless of whether such a facsimile system is operating in a private line mode or a public line mode. The method includes automatically receiving image data in an automatic reception mode upon reception of a ring signal; forming a voice speech upon detection of a hook-off state of a telephone after the ring signal is received; and automatically receiving the image data when the ring signal is not received and a calling tone signal is detected.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
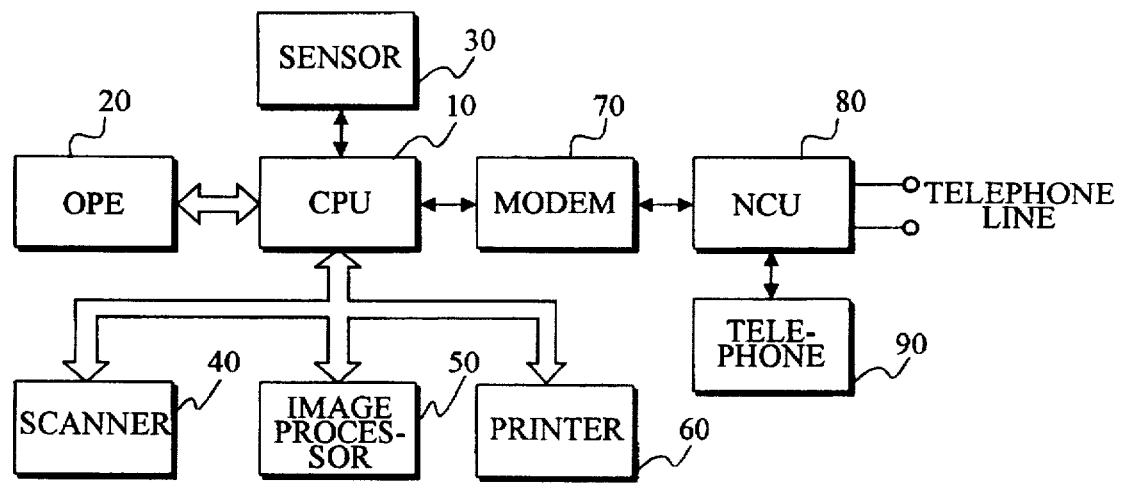
FIG. 1 is a block diagram illustrating a facsimile system constructed according to the principles of the present invention.

Referring now to the drawings and particularly FIG. 1, which illustrates a facsimile system constructed according to the principles of the present invention. The facsimile system includes a controller 10 for controlling operations of the facsimile system, an operational panel OPE 20, a sensor 30, a scanner 40, an image processor 50, a printer 60, a modem 70, a network control unit NCU 80, and a telephone 90.

The controller 10 contains a central processing unit (CPU), a program memory such as a ROM (not shown) which stores programs for the CPU to control the general operation of the facsimile system for transmission or reception of image data from another facsimile system, and a data memory such as a RAM (not shown) which temporarily stores various items of information. An application program for enabling the facsimile system constructed according to the present invention to automatically receive image data representing a document without determining whether the facsimile system is in a private line mode or a public line mode. The operational panel (OPE) 20 includes a key input unit and a display unit. The key input unit of the operational panel 20 comprises numeric keys for generating key data to the controller 10 to dial a telephone number of a counterpart facsimile system. The display unit of the operational panel 112 displays data indicating a mode of operation of the facsimile system. The sensor 30 senses whether a document is input into the facsimile system, or whether copy paper is stored and available for use, and generates an indicative signal to the controller 10. The scanner 40 transports and scans an image of the input document and then generates image data corresponding to the scanned image. The image processor 50 processes the image data output from the scanner 40 in order to generate processed image data for either transmission via a telephone line or copy during the copy mode under control of the controller 10, and processes the image signal received from a telephone line during the reception mode. The printer 60 prints the image data received from the image processor 50 on a printable medium such as individual cut sheets of papers during the reception mode and the copy mode under the control of the controller 10. The modem 70 modulates the image data output from the image processor 50 into a modulated image signal for transmission, and duplicates the image signal input to the image processor 50 during the reception mode under the control of the controller 10. The network control unit (NCU) 80 is connected with a telephone line to form transmission and reception paths for the modem 70 under the control of the controller 10.

Figure 2:
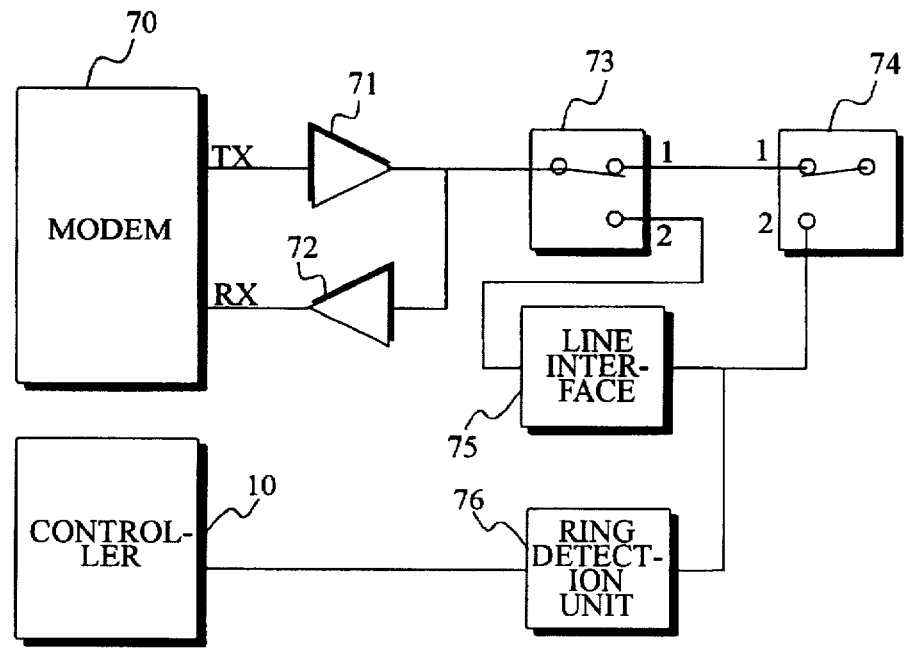
FIG. 2 is a block diagram illustrating a mode selection circuit of a conventional facsimile system for selecting one of a private line mode and a public line mode.

FIG. 2 is a block diagram illustrating a mode selection circuit of a conventional facsimile system for selecting one of a private line mode and a public line mode. Such a mode selection circuit is typically connected between the modem 70 and the CPU of a controller 10 of FIG. 1. Amplifiers 71 and 72 are used to amplify image data received from the telephone line and image data to be transmitted through the telephone line. Switches 73 and 74 are used to enable an operator to select the facsimile system to operate in either a private line mode or a public line mode. Upon selection of a private line mode, both switches 73 and 74 are positioned at position 1 so that a CNG calling tone can be detected without operation of other internal switches. Upon selection of a public line mode for communication through the PSTN however, both switches 73 and 74 are positioned at position 2 so that a ring signal from the telephone line can be detected by a ring detection unit 78 through a line interface 75. As established earlier however, operation of a private line mode is mutually exclusive from that of a public line mode. If the conventional facsimile system is operating in a private line mode, a ring signal indicating an incoming call from the PSTN can damage the internal circuit of a receiver unless the mode selection switch switches to a public line mode. Therefore, such a mode selection circuit, as I have observed, is unnecessarily required.

Figure 3:
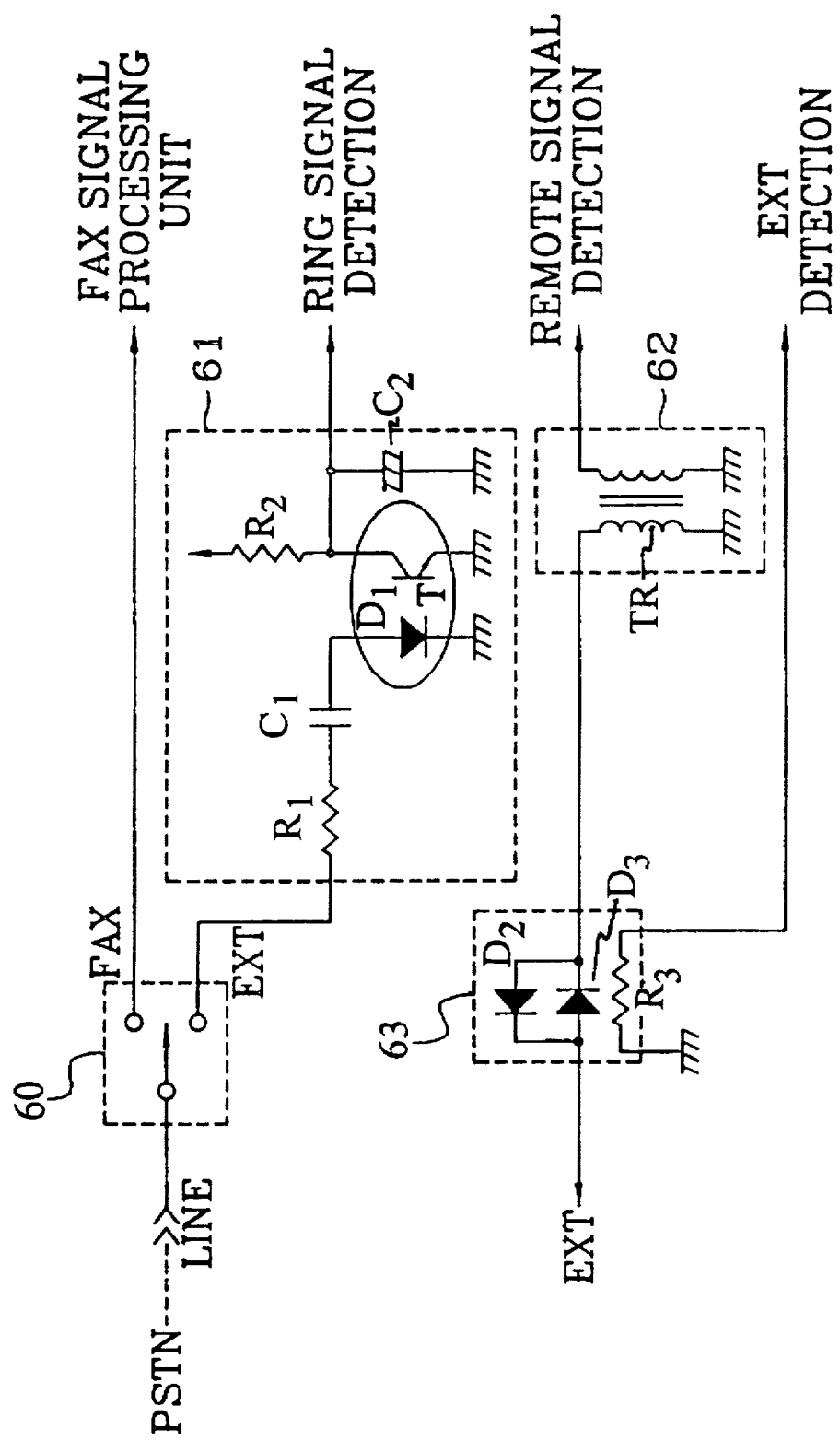
FIG. 3 is a block diagram illustrating an internal circuit of a network control unit including a ring detection unit for detecting a ring signal from a telephone line in response to an incoming call and a calling tone detection unit for detecting a CNG calling tone from the incoming call regardless of whether a facsimile system is operating in a private line mode or a public line mode as contemplated according to the principles of the present invention.

FIG. 3 is a block diagram illustrating an internal circuit of a network control unit including a ring detection unit for detecting a ring signal from a telephone line in response to an incoming call and a calling tone detection unit for detecting a CNG calling tone from the incoming call regardless of whether a facsimile system is operating in a private line mode or a public line mode as contemplated according to the principles of the present invention. In FIG. 3, a switch 60 connected to a telephone line from either a PSTN or a private line is used to automatically select transmission through either a facsimile processing unit contained, for example, in a controller 10 as shown in FIG. 1, or through a ring detection unit 61 under the control of the controller 10. The ring detection unit 61 includes a serially connected resistor R1, capacitor C1 and diode D1 positioned in parallel with a transistor T having one principally conducting electrode connected to ground and another principally conducting electrode separately connected to a second resistor R2 and a condensor C, for detecting a ring signal from the telephone line to inform an incoming call. A calling tone detection unit 62 comprising a transformer TR is used to detect a CNG calling tone from the incoming call. A line interface 63 comprising a pair of diodes D2 and D3 connected in parallel with a third resistor R3.

Figure 4:
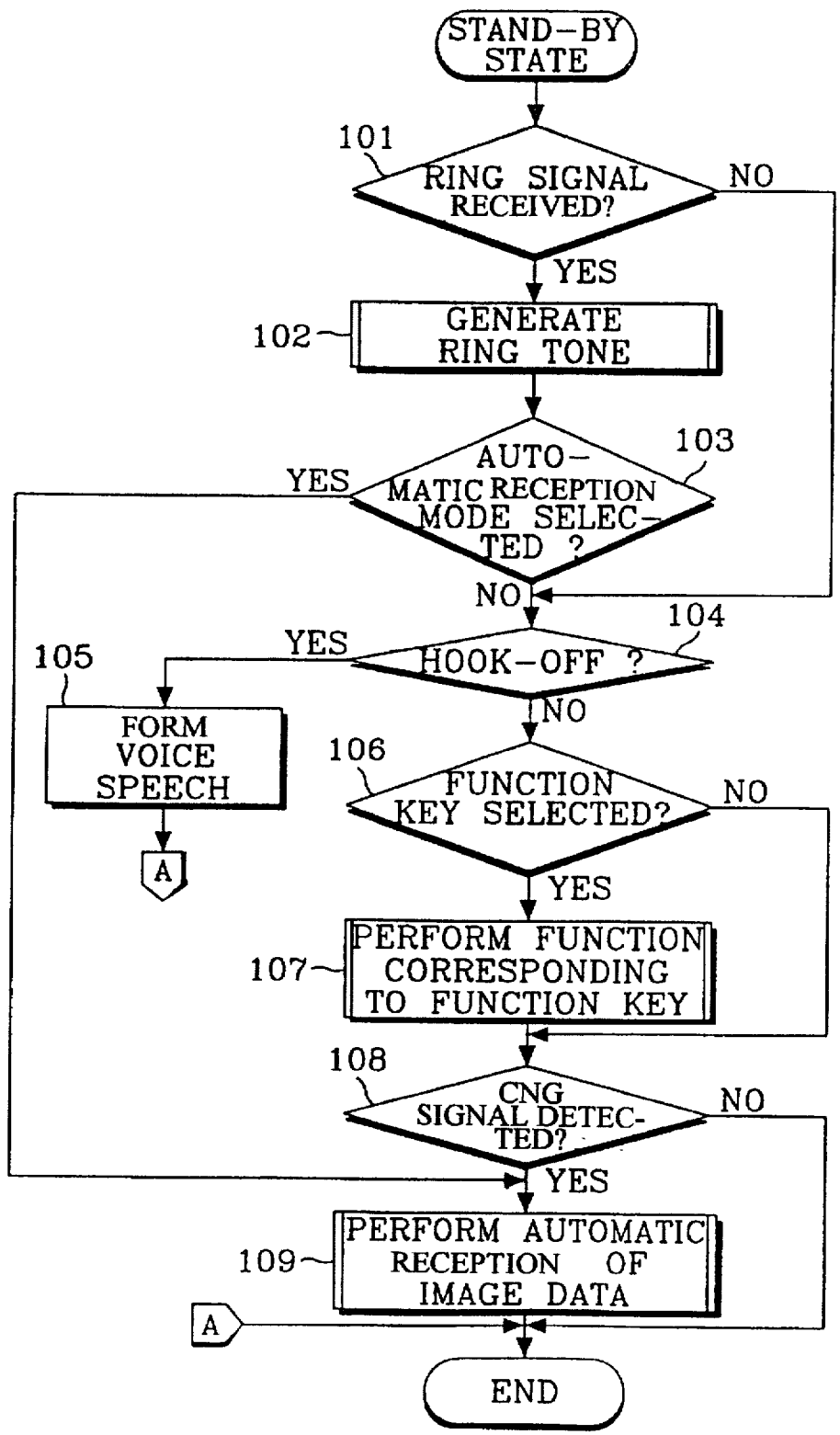
FIG. 4 is a control flow chart illustrating an automatic reception of image data in a facsimile system regardless of whether such a facsimile system is operating in a private line mode or a public line mode as contemplated according to the principles of the present invention.

Turn now to FIG. 4 which illustrates an automatic reception of image data in a facsimile system constructed as shown in FIG. 1 to operate in both a public line mode and a private line mode according to the principles of the present invention. The image data is automatically received regardless of whether such a facsimile system is operating in a private line mode or a public line mode and without requiring an operator to manually switch the facsimile system in either a private line mode or a public line mode. Therefore, the automatic reception of image data method as contemplated by the present invention advantageously eliminates the use of the conventional mode selection switch. Such a method includes generating a ring tone upon reception of a ring signal, detecting whether a facsimile system is set in an automatic reception mode after a ring tone is generated, forming a voice speech upon a hook-off state of a telephone when the facsimile system is not set in the automatic reception mode, forming a voice speech upon a hook-off state of a telephone when a ring signal is not received, performing a function corresponding to an input function key when the telephone remains on-hooked, and automatically receiving the image data reflecting a document upon detection of a calling tone.

With reference to FIGS. 1, 3 and 4, an preferable embodiment according the present invention will be explained as follows.

Under a stand-by state, the CPU of the controller 10 determines whether a ring signal is received from the ring detection unit 61 connected to the telephone line at step 101. When the ring signal is received from the ring detecting unit 61, the controller 10 controls the modem 50 to generate a series of ring tones at step 102. Thereafter, the CPU of the controller 10 checks whether the facsimile system is in an automatic reception mode i.e., whether an automatic reception mode is selected from the operating panel OPE 20 at step 103. When the automatic reception mode is selected therefrom at step 109, the CPU of the controller 10 proceeds to protocol and automatically receives the image data in order to complete the program.

When a ring signal is not received from the ring detection unit 61 connected to the telephone line at step 101, or alternatively, when an automatic reception mode is not selected from the OPE 20 at step 104, the CPU of the controller 10 checks whether the telephone 90 is in an on-hook or off-hook state at step 104. If the telephone 90 is in an off-hook state i.e., when an operator picks up the telephone to answer a call, the CPU of the controller 10 forms a voice speech at step 105. If, however, the telephone 90 is in an on-hook state, the CPU of the controller 10 checks, in step 106, whether any function key is selected by an operator from the operating panel OPE 20. Thus, when there is a function key input from the operating panel OPE 20, the CPU of the controller 10 performs a function corresponding to the input function key at step 107. Thereafter, the CPU of the controller 10 proceeds to determine whether a CNG calling tone is detected from a calling tone detection unit 62 at step 108 in order to automatically receive image data reflecting a document at step 109. When there is no function key input from the operating panel OPE 20, however, the CPU of the controller 10 determines whether a CNG calling tone is detected from a calling tone detection unit 62 at step 108 in order to automatically receive the image data at step 109. At this time, if the CNG calling tone is not detected from the calling tone detection unit 62 at step 108, the CPU of the controller 10 terminates the program. If the CNG calling tone is detected from the calling tone detection unit 62, however, the CPU of the controller 10 proceeds to the protocol and automatically receives the image data at step 109. After the image data reflecting a document is fully received, the CPU of the controller 10 terminates the program.

As apparent from the foregoing, the present invention can be achieved by a method for automatically receiving image data reflecting a document in a facsimile system without discriminating whether such a facsimile system is in a private line mode or a public line mode. The ring signal is detected and image data is automatically received without regards to whether a facsimile system is in a private line mode and a public line mode. While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for automatically receiving image data in a facsimile system including a telephone operable in one of a private line mode and a public line mode, said method comprising the steps of:

automatically receiving said image data from a telephone line regardless of whether said facsimile system is operating in one of said private line mode and said public line mode, upon reception of a ring signal responding to an incoming call when said facsimile system has been set in an automatic reception mode, said private line mode indicating that said facsimile system is directly connected to another data transmission system, and said public line mode indicating that said facsimile system is connected to another data transmission system through a public switch telephone network;

forming a voice speech upon detection of a hook-off state of said telephone after said ring signal is received from the telephone line, when said facsimile system has not been set in said automatic reception mode; and automatically receiving said image data when said ring signal is not received but a calling tone signal is detected from the telephone line.

2. The method of claim 1, further comprised of generating a standard ring tone in response to reception of said ring signal from the telephone line to inform of an incoming call.

3. The method of claim 2, further comprised of determining whether a function key has been entered by an operator when the telephone remains on-hooked while the standard ring tone is generated in response to reception of the ring signal from the telephone line, and enabling the facsimile system to perform a function corresponding to said function key entered by the operator.

4. The method of claim 3, further comprised of determining whether a function key has been entered by an operator when the telephone remains on-hooked and there is reception of said ring signal, and enabling the facsimile system to perform a function corresponding to said function key entered by the operator.

5. The method of claim 1, further comprised of determining whether a function key has been entered by an operator when the telephone remains on-hooked and there is reception of said ring signal, and enabling the facsimile system to perform a function corresponding to said function key entered by the operator.

6. The method of claim 1, further comprised of said data transmission device corresponding to one of a remote facsimile system and a remote telephone system.

7. A method for automatically receiving image data in a facsimile system including a telephone operable in one of a private line mode and a public line mode, said method comprising the steps of:

generating a ring tone upon reception of a ring signal from a telephone line connected directly to one of a public switch telephone network and another data transmission device in response to an incoming call;

detecting whether said facsimile system has been set in an automatic reception mode regardless of whether said facsimile system is operating in one of said private line mode and said public line mode, upon generation of said ring tone;

forming a voice speech upon detection of a hook-off state of said telephone when said facsimile system has not been set in said automatic reception mode, and alternatively, when said ring signal has not been received from the telephone line;

determining whether a function key has been entered by an operator when the telephone remains on-hooked;

performing a function corresponding to said function key entered by the operator; and automatically receiving said image data upon detection of a calling tone.

8. The method of claim 7, further comprised of said function key being determined when the telephone remains on-hooked while the standard ring tone is generated in response to reception of the ring signal from the telephone line.

9. The method of claim 7, further comprised of said function key being determined when the telephone remains on-hooked and there is reception of said ring signal.

10. The method of claim 7, further comprised of said data transmission device corresponding to one of a remote facsimile system and a remote telephone system.

11. A facsimile system operable in one of a private line mode and a public line mode, comprising:

means for automatically receiving image data from a telephone line regardless of whether said facsimile system is operating in one of said private line mode and said public line mode, upon reception of a ring signal responding to an incoming call when said facsimile system has been set in an automatic reception mode, said private line mode indicating that said facsimile system is directly connected to another data transmission system, and said public line mode indicating that said facsimile system is connected to another data transmission system through a public switch telephone network;

means for forming a voice speech upon detection of a hook-off state of said telephone after said ring signal is received from the telephone line, when said facsimile system has not been set in said automatic reception mode; and means for enabling automatic reception of said image data when said ring signal is not received but a calling tone signal is detected from the telephone line.

12. The facsimile system of claim 11, further comprised of a finger for generating a standard ring tone in response to reception of said ring signal from the telephone line to inform of an incoming call.

13. The facsimile system of claim 12, further comprised of a sensor for determining whether a function key has been entered by an operator when the telephone remains on-hooked while the standard ring tone is generated in response to reception of the ring signal from the telephone line, and enabling the facsimile system to perform a function corresponding to said function key entered by the operator.

14. The facsimile system of claim 13, further comprised of said sensor for determining whether a function key has been entered by an operator when the telephone remains on-hooked and there is reception of said ring signal, and enabling the facsimile system to perform a function corresponding to said function key entered by the operator.

15. The facsimile system of claim 11, further comprised of a sensor for determining whether a function key has been entered by an operator when the telephone remains on-hooked and there is reception of said ring signal, and enabling the facsimile system to perform a function corresponding to said function key entered by the operator.

16. The facsimile system of claim 11, further comprised of said data transmission device corresponding to one of a remote facsimile system and a remote telephone system.

* * * * *